United States Patent [19]
Robbins, III et al.

[11] Patent Number: 5,632,417
[45] Date of Patent: *May 27, 1997

[54] DISPENSING CAP AND RELATED HINGE

[75] Inventors: Edward S. Robbins, III, 2802 E. Avalon Ave., Muscle Shoals, Ala. 35661; Gregory S. Burcham, Spruce Pine, Ala.

[73] Assignee: Edward S. Robbins, III, Muscle Shoals, Ala.

[*] Notice: The term of this patent shall not extend beyond the expiration date of Pat. No. 5,542,579.

[21] Appl. No.: 408,409

[22] Filed: Mar. 22, 1995

Related U.S. Application Data

[63] Continuation-in-part of Ser. No. 352,104, Nov. 30, 1994, Pat. No. 5,542,579, which is a continuation-in-part of Ser. No. 220,530, Mar. 31, 1994, Pat. No. 5,487,494, which is a continuation-in-part of Ser. No. 47,086, Apr. 16, 1993, abandoned, which is a continuation-in-part of Ser. No. 237,336, May 3, 1994, Pat. No. 5,465,871, which is a continuation of Ser. No. 979,042, Nov. 19, 1992, abandoned.

[51] Int. Cl.⁶ ...................................................... B67D 5/38
[52] U.S. Cl. .................... 222/158; 222/189.05; 222/456; 222/481
[58] Field of Search ............................ 222/142.1, 142.4, 222/154, 156, 157, 158, 189.02, 189.03, 189.05, 424, 424.5, 425, 441, 454, 456, 480, 481, 556, 562

[56] References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard | 222/572 X |
| 2,214,437 | 9/1940 | Punte et al. | 206/42 |
| 2,339,644 | 1/1944 | Lucas | 222/425 |
| 2,370,820 | 3/1945 | Stott | 222/456 |
| 2,449,285 | 9/1948 | Ekstrom | 220/253 |
| 2,784,884 | 3/1957 | Borie, Jr. | 222/336 |
| 2,804,103 | 8/1957 | Wall | 141/381 |
| 2,811,281 | 10/1957 | Donovan | 222/154 X |
| 2,840,124 | 6/1958 | Greene | 222/212 X |
| 2,844,266 | 7/1958 | Hofe | 215/244 |
| 2,969,167 | 1/1961 | Libit | 222/512 |
| 2,985,343 | 5/1961 | Mask | 222/442 |
| 3,020,659 | 2/1962 | Paulini | 40/307 |
| 3,033,420 | 5/1962 | Thomas et al. | 222/1 |
| 3,140,799 | 7/1964 | Mehr | 222/519 X |
| 3,424,355 | 1/1969 | Blumen | 222/450 |
| 3,486,665 | 12/1969 | La Croce | 222/480 |
| 3,860,111 | 1/1975 | Thompson | 206/534 |
| 3,933,271 | 1/1976 | McGhie | 222/556 X |
| 3,948,105 | 4/1976 | Johnson, Jr. | 73/427 |
| 4,069,935 | 1/1978 | Hampel | 215/203 |
| 4,079,859 | 3/1978 | Jennings | 222/1 |
| 4,083,467 | 4/1978 | Mullins et al. | 220/90.4 |
| 4,144,989 | 3/1979 | Joy | 222/438 |
| 4,164,301 | 8/1979 | Thayer | 220/253 |
| 4,209,100 | 6/1980 | Uhlig | 215/216 |

(List continued on next page.)

*Primary Examiner*—Joseph Kaufman
*Attorney, Agent, or Firm*—Nixon & Vanderhye P.C.

[57] ABSTRACT

A measuring/dispensing cap adapted for attachment to an open, upper end of a container, the cap including a lid and a peripheral skirt extending downwardly from the lid, the lid pivotally secured to the skirt; a sifter panel integral with the skirt and separating the skirt into upper and lower sections, the upper section including a measuring chamber and the lower section including a screw thread for attaching the cap to the open upper end of the container. The sifter panel is formed to provide a flow opening on one side of a horizontal centerline extending across the cap, the flow opening defined in part by a first edge extending parallel to and spaced from the horizontal centerline. A rotatable weir dam panel overlies the sifter panel, the weir dam panel having a second edge which may be aligned with the first edge to enable substantially free flow of container contents through the flow opening. The lid is pivotally secured to an upper edge of the peripheral skirt by an integral hinge having a center tab and a pair of hoops laterally spaced from opposite sides of the center tab.

9 Claims, 5 Drawing Sheets

U.S. PATENT DOCUMENTS

| | | | |
|---|---|---|---|
| 4,292,846 | 10/1981 | Barnett | 73/427 |
| 4,298,038 | 11/1981 | Jennings | 141/2 |
| 4,318,500 | 3/1982 | Melikian | 222/425 |
| 4,346,823 | 8/1982 | Eppenbach | 222/443 |
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 215/237 |
| 4,606,481 | 8/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |
| 4,691,821 | 9/1987 | Hofmann | 206/216 |
| 4,693,399 | 9/1987 | Hickman et al. | 222/480 |
| 4,714,181 | 12/1987 | Kozlowski et al. | 222/480 |
| 4,723,693 | 2/1988 | DeCoster | 222/483 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,123,561 | 6/1992 | Gross | 222/556 X |
| 5,139,181 | 8/1992 | VerWeyst | 222/480 |
| 5,141,138 | 8/1992 | Odet et al. | 222/556 X |
| 5,221,017 | 6/1993 | Cistone et al. | 222/556 X |
| 5,368,176 | 11/1994 | Thanisch | 222/556 X |

DISPENSING CAP AND RELATED HINGE

RELATED APPLICATIONS

This application is a continuation-in-part of commonly owned application Ser. No. 08/352,104 filed Nov. 30, 1994 now U.S. Pat. No. 5,542,577, which is a continuation-in-part of commonly owned application Ser. No. 08/220,530 filed Mar. 31, 1994, now U.S. Pat. No. 5,487,494, which is a continuation-in-part of commonly owned application Ser. No. 08/047,086 filed Apr. 16, 1993, now abandoned which is a continuation-in-part of commonly owned application Ser. No. 08/237,336 filed May 3, 1994, now U.S. Pat. No. 5,465,871, which is a continuation of commonly owned Ser. No. 07/979,042, now abandoned filed Nov. 19, 1992, all of which are incorporated herein by reference.

BACKGROUND AND SUMMARY OF THE INVENTION

The present invention relates generally to dispensing containers and, more specifically, to dispensing cap and related hinge constructions enabling accurately measured amounts of the container contents (in granular, particulate or powder form) to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

The present invention eliminates the need for measuring spoons or cups by providing a hollow cap, which serves as its own measuring device, for use with an otherwise conventional container. While the incorporation of a measuring function into a container/cap construction for the discharge of desired amounts of the container contents is not new (see for example, U.S. Pat. Nos. 1,802,284; 2,804,103; 3,860,111; 4,613,057 and 4,635,828), the present invention provides improved and simplified structures for accomplishing this result, while generally retaining the desirable option of substantially unrestricted pouring and/or shaking (and the further option of sifting) of the container contents from the dispenser cap.

In one exemplary embodiment of the invention, a transparent plastic cap is provided which includes a top and a depending skirt. The skirt is divided into upper and lower portions by an internal, curved partition or weir panel provided with a weir aperture lying on one side of a centerline extending across the cap. The weir panel, in combination with the skirt wall and the top, combine to form a measuring chamber into which a desired amount of container contents may be poured via the weir aperture, as described in parent application Ser. No. 08/047,086, incorporated herein by reference. In the specifically disclosed embodiment of this continuation-in-part application, the dispenser cap includes a single door or lid formed essentially by the entire top of the cap, and pivotally secured to the skirt portion of the cap by a new and improved integral hinge. The free edge of the lid, which is diametrically opposed to the integral hinge, lies on the opposite side of the horizontal cap center line from the weir aperture.

Specifically, the hinge in accordance with this invention is designed to cause the cap door or lid to spring open upon initial release from the skirt rim, and upon further manual movement to a fully open position, to remain in the latter position without user assistance. The initial release position permits measured amounts of container contents to flow out of the measuring chamber without any further manipulation of the top by the user subsequent to the release of the top or lid from the skirt. Once moved manually to the fully extended or open position, unrestricted pouring is permitted without the user having to hold the top or lid in the fully open position.

The hinge includes a central tab portion flanked on either side thereof by discrete and independent leaf spring elements or hoops. Both the central tab portion as well as the hoops are thinned where they join to the cap to facilitate the hinging action, while the hoop elements are also bowed outwardly between the door and the skirt portion of the cap.

In an alternative and preferred embodiment, the above hinge construction is provided in a dispensing cap which incorporates a sifter as an integral part of the cap. More specifically, a plastic cap is provided which includes a top and a depending skirt. The skirt incorporates an inverted, partial dome-like (or partial upright bowl-shaped) sifter panel which is provided with a plurality of sifter apertures, but which is also formed to create a flow opening lying on one side of a horizontal center line extending through the cap. This flow opening is defined by a straight edge or chord on the sifter panel extending between two parts of the annular periphery of the skirt, and is referred to herein sometimes as a chordal segment-shaped opening. The sitter panel, in combination with the skirt wall and the cap top wall as well as the rotatable weir dam panel described below, form a measuring chamber into which a desired amount of container contents may be transferred as described further herein. A weir dam panel, having a curvature complementary to that of the sitter panel, is snap-fit onto the stationary sitter panel at a location coincident with a vertical center axis of the cap, such that the weir dam panel is rotatable about the vertical center axis, relative to the stationary sifter panel. This weir dam panel is provided with a shape similar to the sitter panel in plan so that a chordal segment-shaped weir opening established by a straight edge or chord of the weir dam panel may be aligned vertically with the similarly shaped flow opening in the sifter panel. In addition, a vertical tab is provided on the weir dam panel which extends upwardly to permit the user to rotate the weir dam panel to either of two operative positions. This combined weir panel/sifter construction is described in parent application Ser. No. 08/352,104, also incorporated herein by reference.

Thus, in its broader aspects, tile invention here relates to a container cap comprising a peripheral skirt; and a door or lid pivotally secured to an upper edge of the peripheral skirt by an integral hinge having a center tab and a pair of hoops laterally spaced from opposite sides of the center tab.

In another aspect, the invention relates to a container and associated cap construction wherein the cap is removably secured to the container, the cap comprising a peripheral skirt; and a door or lid pivotally secured to an upper edge of the peripheral skirt by an integral hinge having a center tab and a pair of hoops laterally spaced from opposite sides of the center tab.

In another aspect, the invention relates to a container cap comprising a peripheral skirt; and a door or lid pivotally secured to an upper edge of the peripheral skirt by an integral hinge, the integral hinge including first means for springing the lid to a partially open position upon release from the skirt and second means for maintaining the lid in a fully open position after the lid has been moved manually from the partially open position to the fully open position.

In still another aspect, the invention relates to a measuring/dispensing cap adapted for attachment to an open, upper end of a container, the cap comprising a lid and a peripheral skirt extending downwardly from the lid, the lid pivotally secured to the skirt; a sifter panel integral with the skirt and separating the skirt into upper and lower sections, the upper section including a measuring chamber and the lower section including means for attaching the cap to the open upper end of the container; and wherein at least the lid is provided with volume indicators; the sifter panel formed to provide a flow opening on one side of a horizontal centerline extending across the cap, the flow opening defined in part by a first edge extending parallel to and spaced from the horizontal centerline: and a rotatable weir dam panel overlying the sifter panel, the weir dam panel having a second edge which may be aligned with the first edge to enable substantially free flow of container contents through the flow opening; said lid pivotally secured to an upper edge of the peripheral skirt by an integral hinge having a center tab and a pair of hoops laterally spaced from opposite sides of the center tab.

Other objects and advantages will become apparent from the detailed description which follows.

DETAILED DESCRIPTION OF THE DRAWINGS

Figure 1:
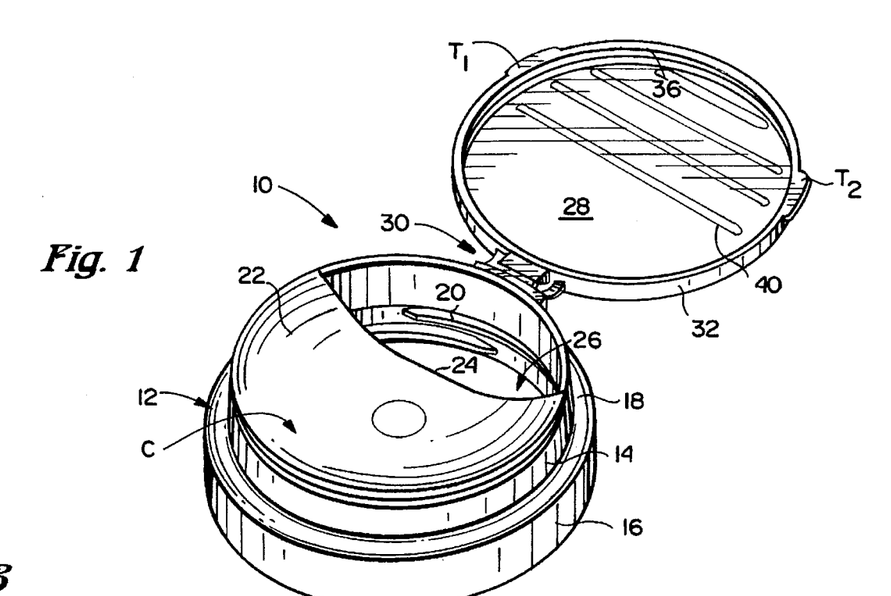
FIG. 1 is a perspective view of the dispensing cap in accordance with the invention, with the cap door shown in an open position.
Figure 2:
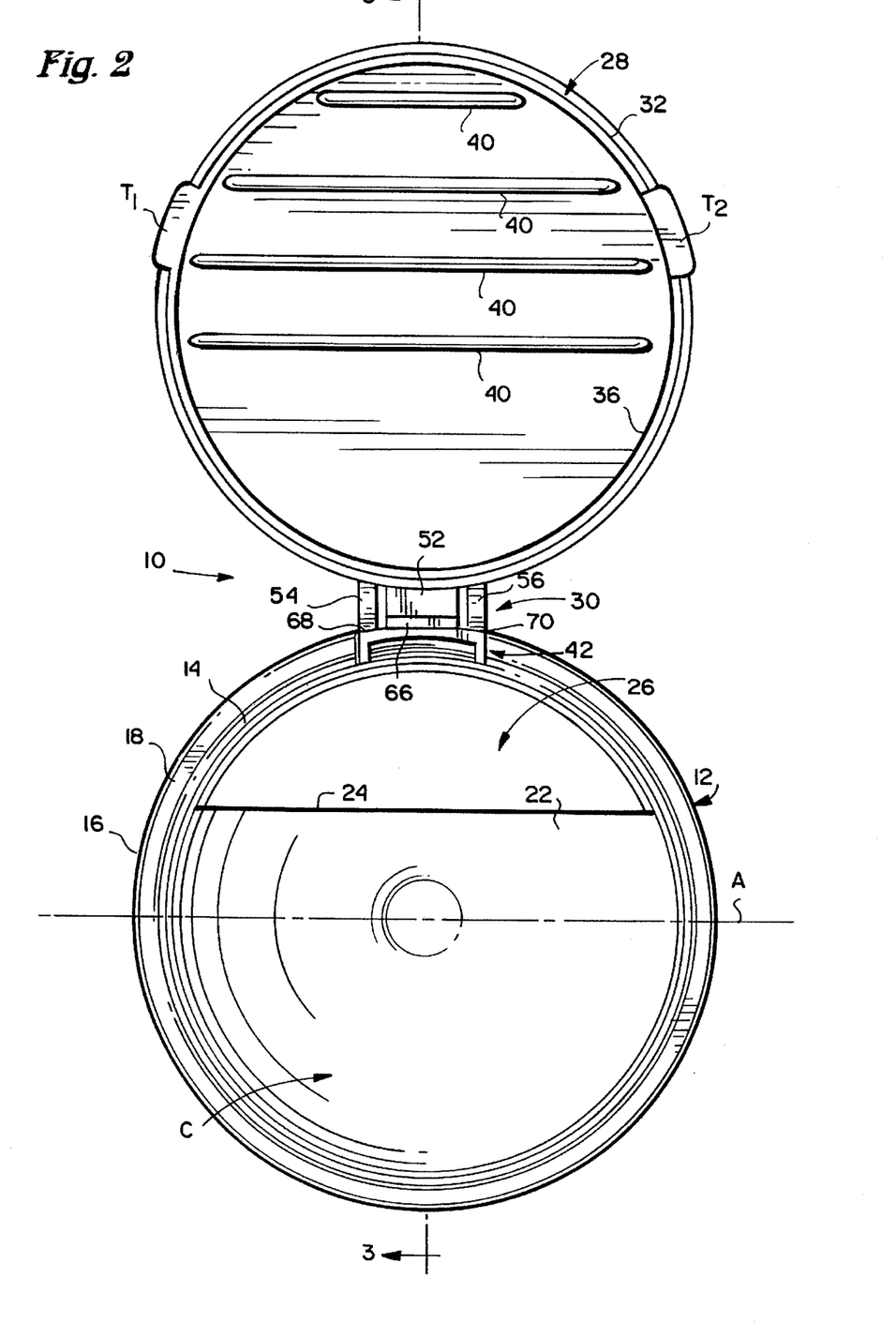
FIG. 2 is a plan view of the cap shown in FIG. 1.

With reference now to FIGS. 1 and 2, the measuring/ dispensing cap 10 includes a peripheral skirt 12 including an upper skirt portion 14 and a lower skirt portion 16 connected by an annular shoulder 18. Lower skirt portion 16 is formed with an internal screw thread 20 adapted to cooperate with an external thread on the upstanding dispensing portion of a container or a jar (not shown) in the manner of a typical threaded closure. A weir panel 22, integrally formed with the cap, has an inverted, partial dome-like shape which is terminated at a weir edge 24, which, along with a peripheral portion of the skirt 12, defines a weir opening 26 (having a chordal segment shape when viewed in plan). The edge 24 lies to the weir opening side of a diametrical center line A (see FIG. 2) extending horizontally across the cap. i.e., the aperture lies wholly on one side of the center line, and the edge 24 is spaced from that center line, thereby enabling the weir panel to effectively perform a dam function as also described in greater detail below. The integral weir panel 22 extends downwardly from the upper edge of the skirt 12 to partially define a volumetric space or chamber C from which measured amounts of container contents can be dispensed as described in greater detail below.

The dispensing door or lid 28 for the cap 10 in this exemplary embodiment includes the entire top wall of the cap. The door or lid 28 is pivotally secured to the upper skirt portion 14 by an integral hinge 30. The dispensing door or lid 28 is also formed with a peripheral rim 32 which is designed to telescope over the uppermost edge 34 of the upper skirt portion 14 such that a radial bead or shoulder 36 on the rim 32 will snap over the edge 34 and into an annular recess 38 provided in the upper skirt portion 14, just below the edge 34. It will be appreciated that other friction fit arrangements may be provided as between the door 28 and the skirt 14. It is preferred, however, that any such arrangement provide a substantially air-tight fit so that the container contents will remain fresh over extended periods of time.

In the preferred arrangement, the entire cap 10 may be constructed of transparent plastic material. It will be appreciated, however, that the skirt portion 14 may be formed of opaque material if desired. The dispensing door 28 is also provided with volume indicators 40 to facilitate measurement of contents transferred into the chamber C. In the event skirt 12 is also formed of transparent material, the volume indicators may, if desired, continue along adjacent portions of the upper skirt portion 14.

Figures 4, 6:
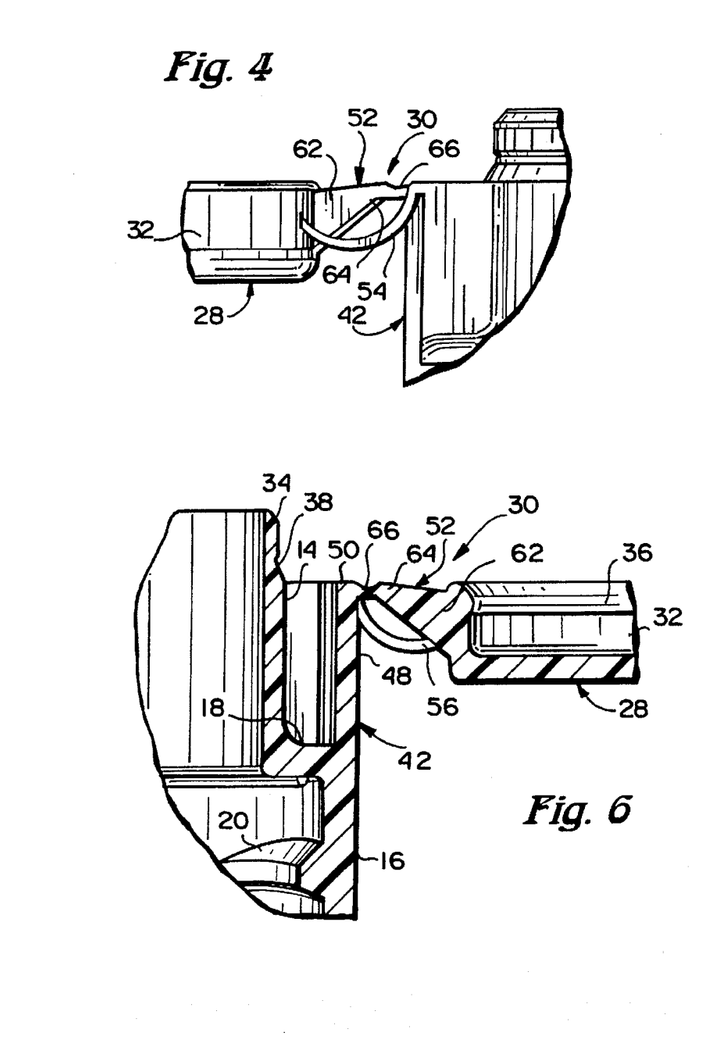
FIG. 4 is a partial side elevation of the cap illustrated in FIG. 1.
FIG. 6 is an enlarged detail of the section illustrated in FIG. 3.
Figures 5, 7:
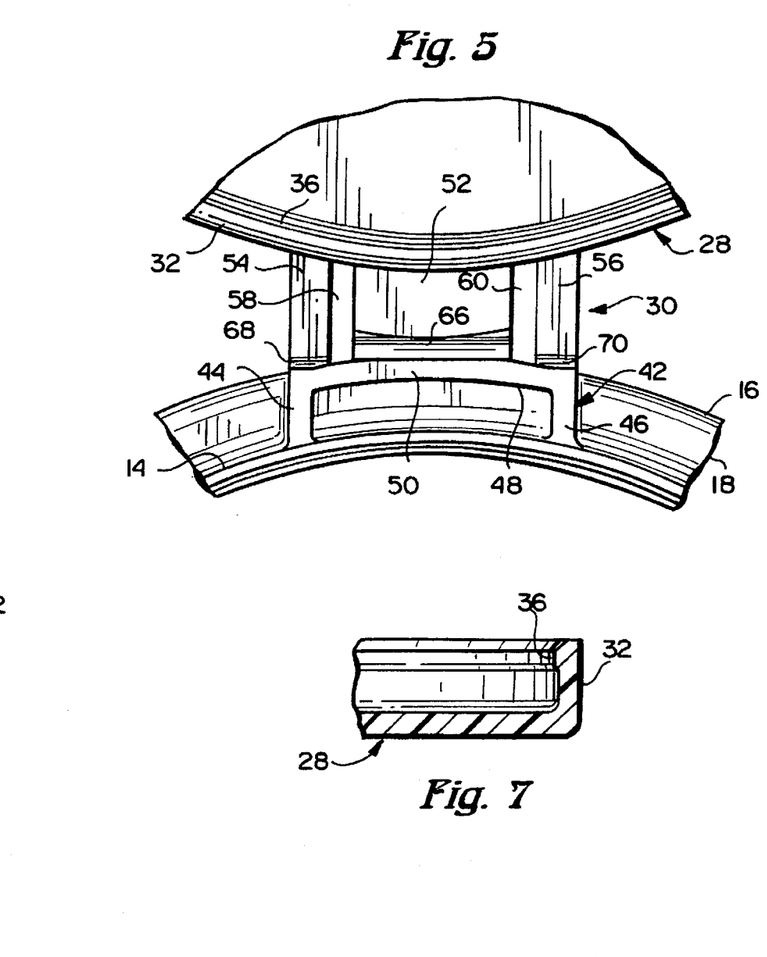
FIG. 5 is an enlarged partial plan of the cap shown in FIGS. 1–3.
FIG. 7 is an enlarged detail of the cap door or lid as shown in FIG. 3.
Figure 8:
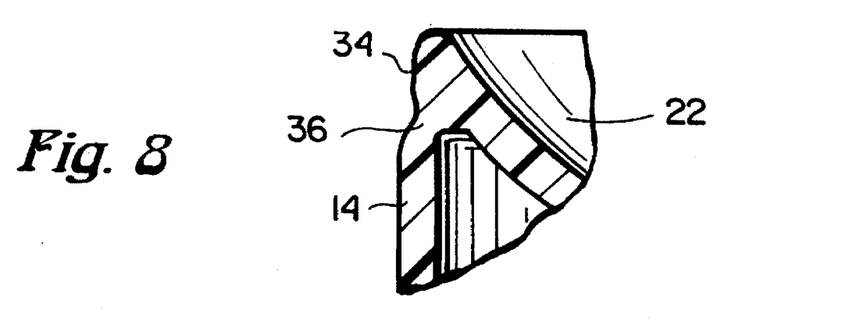
FIG. 8 is an enlarged detail of the upper edge of the cap skirt taken from the section in FIG. 3.

With reference now specifically to FIGS. 4, 5 and 6, the hinge 30 joins with a hollow, box-like housing 42 formed by a pair of parallel side walls 44, 46 extending upwardly from the shoulder 18 and along the upper skirt portion 14. These side walls 44, 46 are joined by a peripheral wall 48 which is simply an upward extension of the lower skirt portion 16, spaced radially outwardly from the upper skirt portion 14. The hinge housing 42 is thus closed at its lower end by the shoulder 18 and is open at its upper end where the hinge 30 joins to the peripheral wall 48 along the upper edge 50 thereof.

The hinge 30 is itself comprised of three components: a center tab 52 and a pair of hinge straps or hoops 54, 56 located on opposite sides of the tab 52. Straps 54, 56 are laterally spaced from the center tab 52 by identical gaps or spaces 58, 60. The center tab 52 is a solid member, with a relatively thicker end at 62 where the tab joins with the rim 32 of the door 28. The tab 52 tapers to a relatively thinner end at 64 where the tab joins to the peripheral wall 48 of the hinge housing 42. The tab is further thinned during the molding process along a hinge line 66 which allows the tab 52 to pivot through substantially 180° from a fully open to a fully closed position of the door 28 as described further below.

Figure 3:
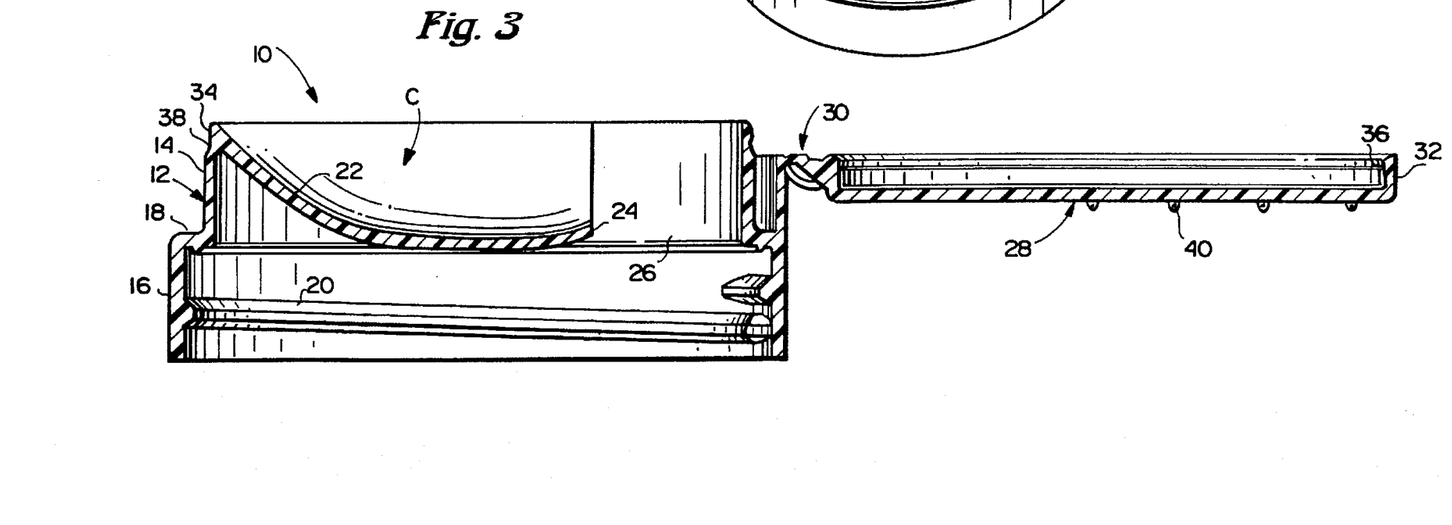
FIG. 3 is a section taken along the line 3—3 of FIG. 2.

The flexible straps or hoops 54 and 56 are of substantially uniform thickness except for thinned regions 68, 70, respectively (see FIG. 5) where the hoops join to the peripheral wall 48 of the hinge housing 42. The hoops 54, 56 have lengths greater than that of the center tab 52, i.e., greater than the gap between the hinge housing 42 and the rim 32 when the door 28 is in its fully open position, so that the hoops bow in a downward direction (i.e., define a convex curve in the downward direction) when the cap 28 is in the fully open position, as best seen in FIGS. 3, 4 and 6.

Figure 9:
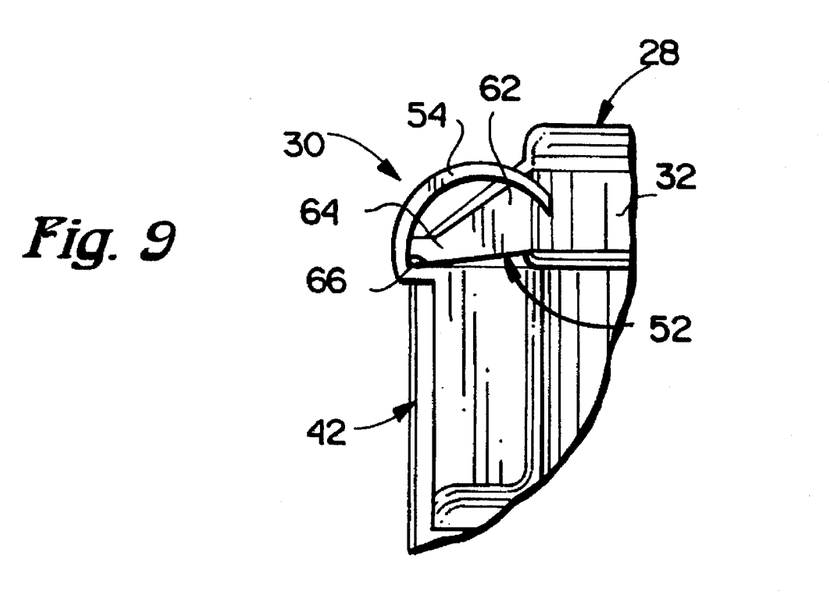
FIG. 9 is a partial side elevation of the dispensing cap in accordance with this invention, with the cap door in a closed position.

The relative changes in position of the rigid tab 52 and flexible hoops 54, 56 between the open and closed positions of the hinged door 28 are best seen from a comparison of FIGS. 4 and 9.

It has been determined that the hinge 30 as described herein has two important features or characteristics which greatly facilitate the use of the cap. First, the flexible hoops 54, 56 tend to cause the cap to spring open when the user disengages the lid from the recess 38 and edge 34 of the upper skirt portion 14. This initial springing action opens the door between about 45° and about 75° as measured from the upper edge of the skirt 12, a more than sufficient distance to allow the measured contents to flow out of the chamber C, facilitated by the curved weir panel 22. As a result, the user can hold the container and, with the lid closed, transfer the desired amount of container contents into the chamber C, and then open it with one hand by simply pushing the top lid 28 open, using the thumb or index finger to engage one of the tabs $T_1$ or $T_2$. When the lid is in this initial open position, the already measured contents flow easily out of the chamber C.

On the other hand, for "flow through" of unmeasured amounts, it is useful to fully open the door 28 to the position shown in FIG. 1 and allow unmeasured amounts of contents to flow from the container through the opening 26 and directly out of the cap. When this is done manually, the hinge arrangement, and particularly the center tab 52, maintains the door 28 in this fully open position so that the contents can flow freely through the weir opening 26 and out of the cap 10 without interference from the lid 28, and without additional manipulation on the part of the user.

Figure 10:
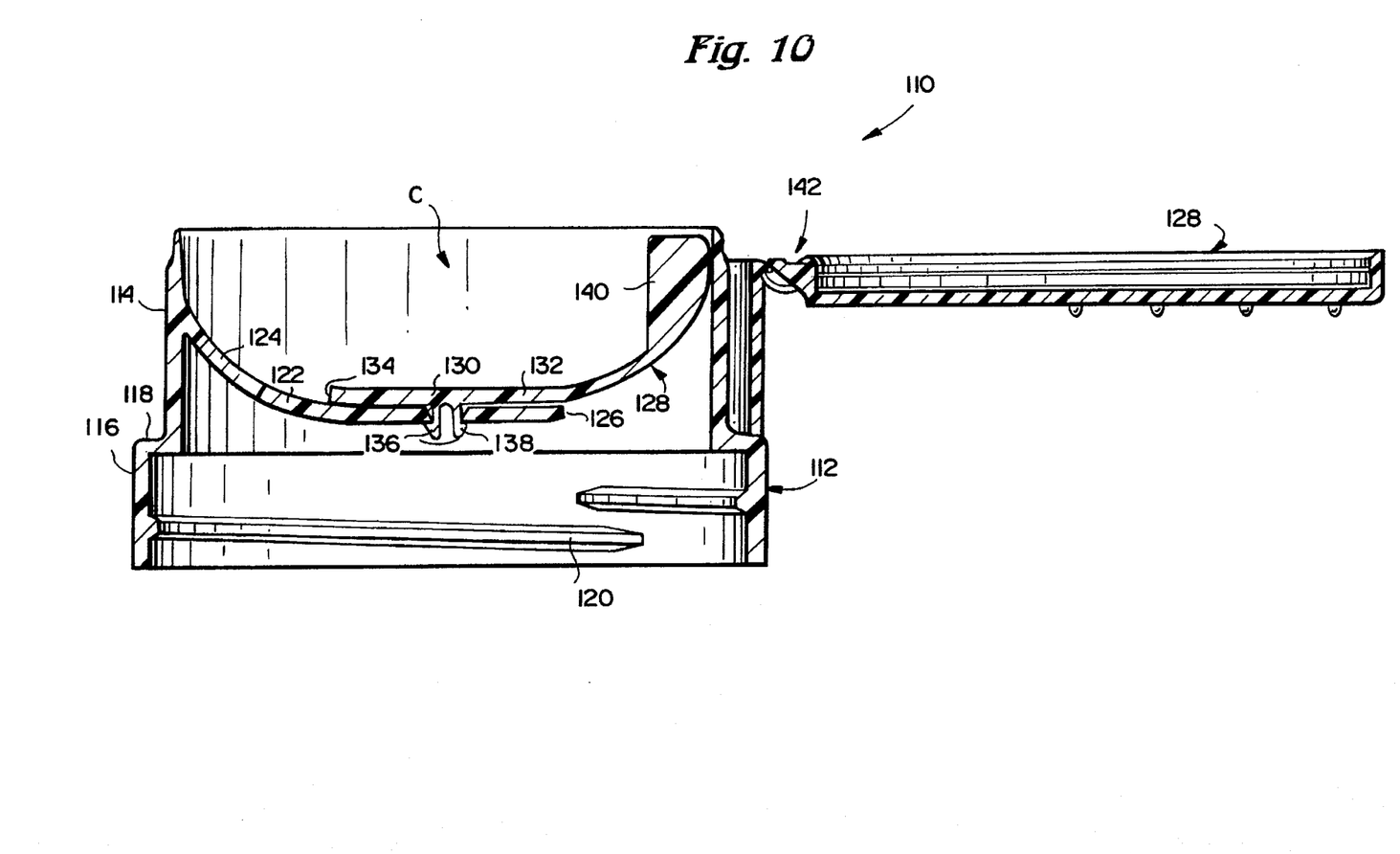
FIG. 10 is a side section of a dispensing cap in accordance with an alternative embodiment of the invention.

The hinge construction described herein is also particularly useful in a combined measuring/sifting cap as illustrated in FIG. 10. In this embodiment, the measuring/dispensing cap 110 includes a peripheral skirt 112 including an upper skirt portion 114 and a lower skirt portion 116 connected by an annular shoulder 118. The lower skirt portion 116 is formed with an internal screw thread 120 adapted to cooperate with external threads on the upstanding dispensing portion of a container or jar (not shown) as described above.

The interior of the cap 110 is formed with a partially annular, integral sifter panel 122 which is curved in the manner shown in FIG. 10 (resembling a partial inverted dome), and which includes a plurality of sifter apertures 124 (only one shown in FIG. 10 but see the array of apertures in co-pending application Ser. No. 08/352,104 incorporated by reference herein). The arcuate extent of the sitter panel 122 terminates along a chord or straight edge 126 to thereby define a flow opening 128 defined by the edge 126 in combination with an arcuate portion of the upper skirt portion 114. This sifter panel 122 is formed with a centrally located aperture 130 which permits securement of a weir dam panel 132 as described below. Edge 126 lies to one side of a horizontal centerline through the cap as described above in connection with the first exemplary embodiment.

The weir dam panel 132 has a size and arcuate shape similar to that of the sifter panel 122 but does not include any apertures 124, i.e., the weir panel 132 is solid. The weir dam panel 132 has a curvature similar to the sifter panel 122 and the arcuate extent of the weir dam panel 132 as defined by edge 134 is also similar to the sifter panel in that chord or straight edge 134 of the weir dam panel 132 creates a second flow opening which may be aligned with the sifter panel flow, opening 128 so that the similar sized and shaped flow openings of each are superposed one on the other.

The weir dam panel 132 is also provided with a pair of downwardly projecting spring fingers 136, 138 which, upon lateral compression, will pass through the aperture 130 in the sifter panel 122 and then spring outwardly so that the weir dam panel 132 is rotatably mounted on the sifter panel 122 for rotation about the vertical center axis coincident with a vertical center axis of the cap. The weir dam panel 132 is also provided with an upstanding projection or tab 140 which facilitates user rotation of the weir dam panel 132 within the cap. It will be appreciated that the sitter panel 122 and weir dam panel 132, by reason of their inverted dome-like or bowl-shapes, create along with closed lid 128, a measuring chamber C within the cap 10 into which container contents may be transferred as described above in connection with the embodiment illustrated in FIGS. 1–9.

The lid 128 is secured to the upper skirt portion 114 by means of a hinge 142 which is identical to the earlier described hinge 30. With the weir panel 132 rotated to the position shown in FIG. 10, the dispensing cap may be used as a sifter, with the container contents shaken through the sifter apertures 124 without regard to the amount dispensed. In this configuration, it is helpful that the door 128 is maintained in the fully open position as shown in FIG. 10 by the hinge arrangement 142. In an alternative manner of use, the weir panel 132 can be rotated into overlying relationship with the sifter panel 122 and, with the lid 128 in the closed position, a measured amount of container contents can be spilled over the aligned panels 122, 132 into the volumetric chamber C. Then, the lid 128 may be opened as described above such that the hinge causes the lid 128 to spring to a partially open position sufficient to allow the measured amount of contents to slide along the weir panel 132 and out of the cap.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing cap adapted for attachment to an open, upper end of a container, the cap comprising: a lid and a peripheral skirt extending downwardly from said lid, said lid pivotally secured to said skirt; a sifter panel integral with said skirt and separating said skirt into upper and lower sections, the upper section including a measuring chamber and the lower section including means for attaching said cap to the open upper end of the container; and wherein at least said lid is provided with volume indicators; said sifter panel formed to provide a flow opening on one side of a horizontal centerline extending across said cap, said flow opening defined in part by a first edge extending parallel to and spaced from said horizontal centerline; and a rotatable weir dam panel overlying said sifter panel, said weir dam panel having a second edge which is alignable with said first edge to enable substantially free flow of container contents through said flow opening, said lid pivotally secured to an upper edge of the peripheral skirt by an integral hinge assembly including a center tab and a pair of hoops laterally spaced from opposite sides of the center tab.

2. The measuring/dispensing cap of claim 1 wherein said weir panel opening is of substantially similar size and shape as said sifter panel opening; and wherein a plurality of sifting apertures are arranged in an array adjacent said flow opening in said sifter panel.

3. The measuring/dispensing cap of claim 2 wherein said weir panel includes a vertical tab extending upwardly within the measuring chamber to thereby enable rotation of the weir panel from a first position where said weir panel overlies said sifter apertures to a second position where said weir panel overlies said flow opening in said sifter panel.

4. The measuring/dispensing cap of claim 1 wherein said lid is formed entirely of transparent plastic material.

5. The measuring/dispensing cap of claim 1 wherein said weir panel is rotatably secured on said stationary sifter panel.

6. The measuring/dispensing cap of claim 1 wherein said center tab and said hoops are formed with thinned hinge lines where the center tab and hoops join with the upper edge of the peripheral skirt.

7. The measuring/dispensing cap of claim 1 wherein the center tab is a relatively rigid member and said pairs of hoops are relatively thin, flexible members which are bowed away from the center tab.

8. The measuring/dispensing cap of claim 1 wherein the peripheral skirt is formed with a vertically extending housing on an exterior surface of the peripheral skirt, and wherein said center tab and hoops are joined to said housing.

9. The measuring/dispensing cap of claim 1 wherein said cap is transparent and wherein at least said lid is provided with volume indicators.

* * * * *